H. Curtner,
Sausage Stuffer.
No. 92,281.   Patented July 6, 1869.

INVENTOR.
Henry Curtner
By Knight Bro
his Attorneys

ATTEST.
William F. Bauer
Samuel C. K. Brown

United States Patent Office.

HENRY CURTNER, OF ANNA, OHIO.

Letters Patent No. 92,281, dated July 6, 1869.

---

IMPROVED SAUSAGE-STUFFER.

---

The Schedule referred to in these Letters Patent and making part of the same.

---

*To all whom it may concern:*

Be it known that I, HENRY CURTNER, of Anna, Shelby county, Ohio, have invented a new and useful Sausage-Stuffer; and I hereby declare the following to be a full, clear, and exact description thereof, reference being had to the accompanying drawings, making part of this specification.

My invention relates to a sausage-stuffer, in which the meat is placed in a sector-shaped chamber, and is forced through the spout by a follower, whose axis is concentric with the said chamber, the follower being actuated by a lever upon one end of its shaft.

In the drawings—

The cylindrical case has ends A B, which are connected to a circular plate, or hoop, C.

The end A has a hinged shutter or door, $a$, to a sector-shaped meat-chamber, D.

The door has a catch, $a'$, to hold it in a closed or working-position.

E is the shaft of the follower F, which is connected to the shaft by an arm, G, which traverses a slot, $h$, in a cylinder, H, forming the inner boundary of the meat-chamber.

Connected to the arm G and shaft E is a cylinder, I, which turns within the cylinder H, and serves to close the slot $h$, and prevent the passage of meat through the said slot.

Passing diametrically across, within the cylindrical case, is a diaphragm, or partition J, having an aperture, $j$, for reception of the spout K, upon which the entrails are placed when the machine is in operation. This spout also passes through the hoop C.

The end-plates A and B are connected together, and to the hoop C, by bolts L.

Figure 1:
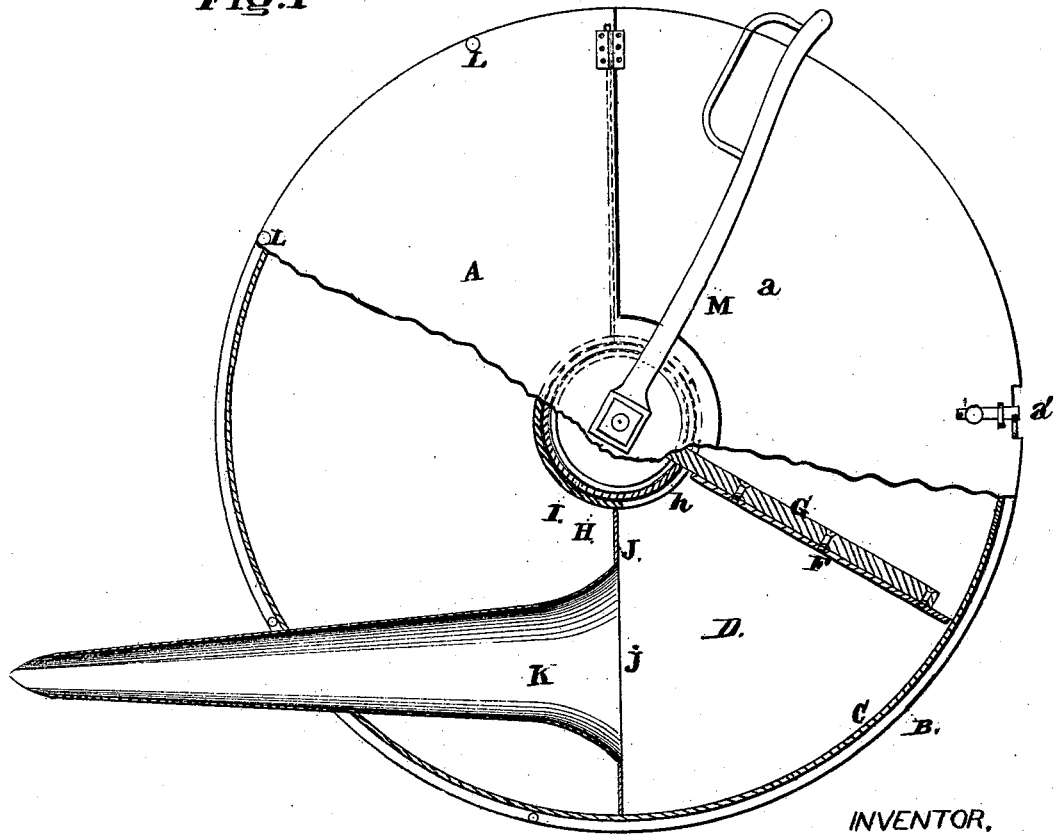
Figure 1 is an end view of my machine, a portion being in section transverse to the shaft of the follower.
Figure 2:
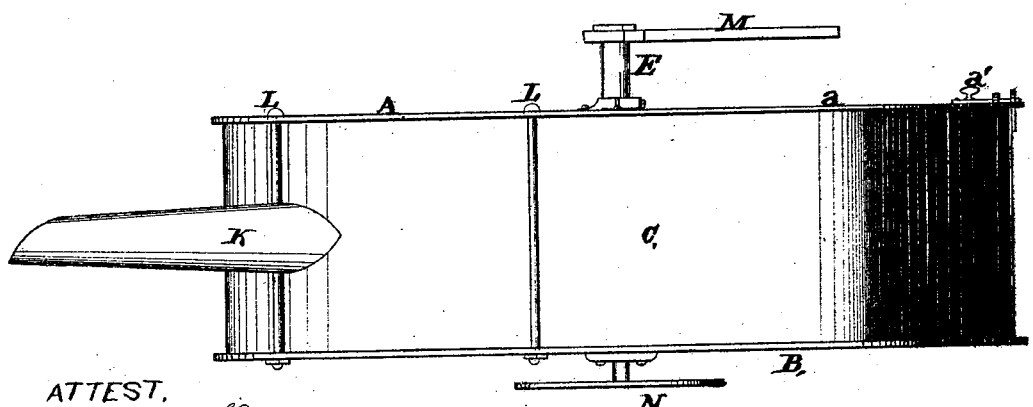
Figure 2 is a side view of the machine.

At one end of the shaft E is a lever or handle, M, by which the shaft receives its motion, and at the opposite end of the shaft to the handle aforesaid, is a heel-screw, N, which serves to sustain the weight of the shaft when the machine is in the position shown in fig. 2.

The operation of the machine is as follows:

The follower is first turned back from the spout, so as to leave the chamber D free for the reception of the comminuted meat, and, the door $a$ being opened, the meat is placed within the chamber, and the door $a$ closed.

The follower is then moved toward the spout by means of the lever, and the meat is forced out through the said spout.

This machine will be seen to have advantages over those in common use, because the meat-chamber can be more readily and completely filled, owing to its whole side being laid open by the swinging back of the door $a$.

In the ordinary stuffer the follower or plunger has to be entirely removed from the meat-chamber, and the latter is only accessible by a small aperture at one end.

From this cause, that is, the inaccessibility of the meat-chamber, it is found difficult to fill the chamber with meat to the entire exclusion of air, and, the latter being forced into the guts along with the meat, is a source of considerable inconvenience, and also detriment, by impairing the merchantable and keeping-qualities of the sausage.

With my arrangement the chamber can be completely and readily filled with meat, and the spout filled also, if desired.

It will be seen that any required power may be applied to the follower, by increasing the length of the lever M.

The case may be fitted into any suitable frame to hold it firmly in position when in operation.

I claim herein as new, and of my invention—

The arrangement of the sector-shaped chamber D, door $a$, follower F, cylindrical or sectional plates H I, and lever M, substantially as and for the purpose stated.

In testimony of which invention, I hereunto set my hand.

HENRY CURTNER.

Witnesses:
JOHN W. EDGELL,
GABRIEL NATCHER.